Figure 1:
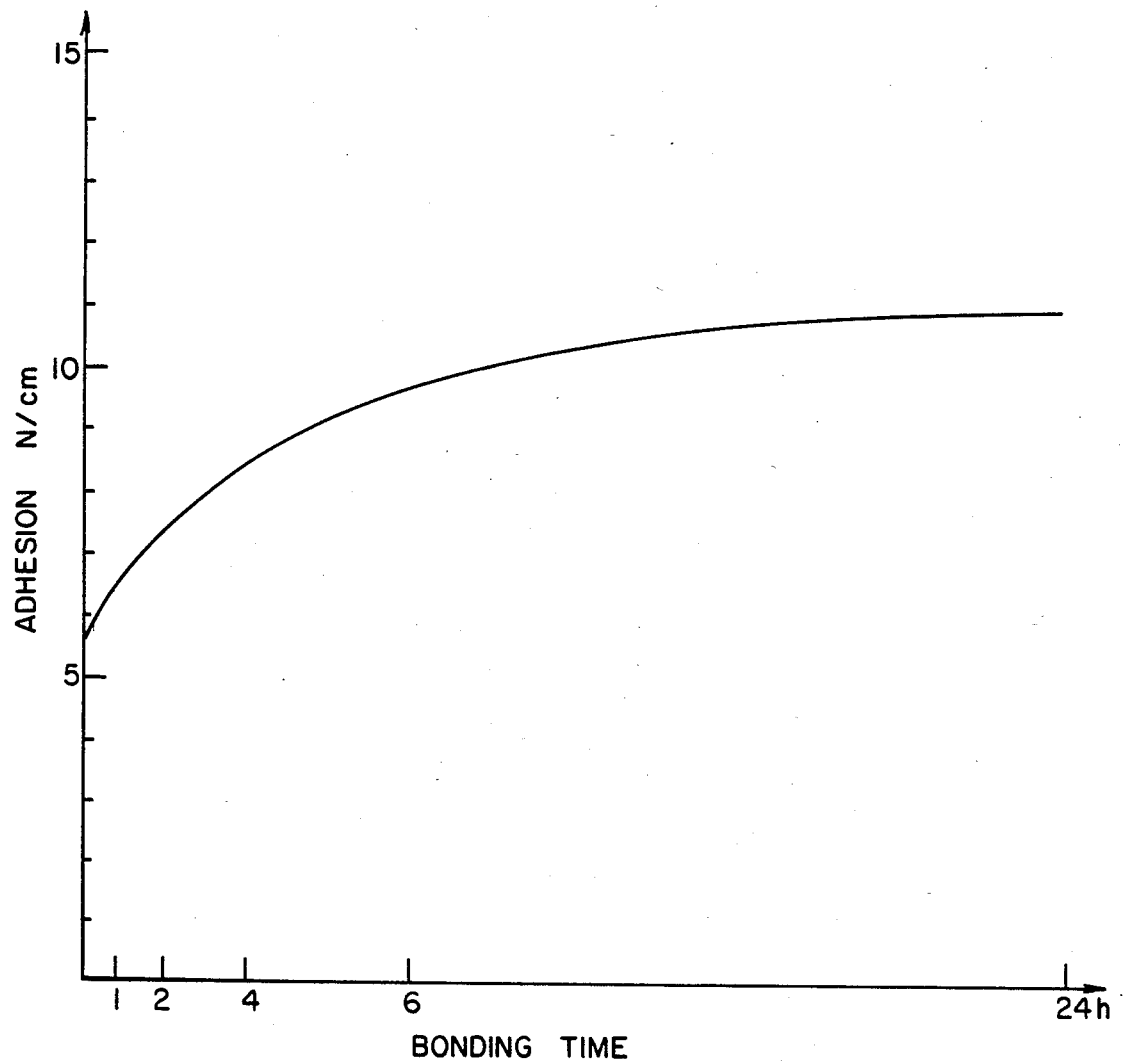

United States Patent [19]

Malek

[11] Patent Number: 4,550,052
[45] Date of Patent: Oct. 29, 1985

[54] GRAVEL-RESISTANT SELFADHESIVE DECORATIVE FILM

[75] Inventor: Wasfi N. Malek, Hamburg, Fed. Rep. of Germany

[73] Assignee: Beiersdorf Aktiengesellschaft, Hamburg, Fed. Rep. of Germany

[21] Appl. No.: 487,429

[22] Filed: Apr. 21, 1983

[30] Foreign Application Priority Data

May 25, 1982 [DE] Fed. Rep. of Germany ....... 3219645

[51] Int. Cl.$^4$ ................ B32B 5/16; B32B 27/10; C09J 7/02
[52] U.S. Cl. .................... 428/323; 428/328; 428/331; 428/40; 428/337; 428/352; 428/354; 428/355; 428/31; 428/424.4; 428/424.6; 428/425.5; 264/175
[58] Field of Search ............ 428/40, 46–47, 428/68, 101, 119, 323, 328, 335–338, 354–356, 352, 424.4, 424.6, 425.5; 525/71, 302; 526/303–306; 260/45.8 N, 876 R

[56] References Cited

U.S. PATENT DOCUMENTS

| | | | |
|---|---|---|---|
| 3,725,122 | 4/1973 | Reinhard | 117/122 P |
| 3,968,184 | 7/1976 | Hardt | 260/876 R |
| 4,223,054 | 9/1980 | Schramer | 428/40 |
| 4,330,352 | 5/1982 | Grimes | 156/235 |

*Primary Examiner*—Patricia C. Ives
*Attorney, Agent, or Firm*—Sprung Horn Kramer & Woods

[57] ABSTRACT

A gravel-resistant selfadhesive decorative film which consists of
  (a) a thermoformable base of a calendered EVA-PVC copolymer film 80–900 μm thick, which is
  (b) coated with a polyurethane primer on which is applied
  (c) a shearing-resistant, aging-resistant acrylate selfadhesive composition on which is present
  (d) a covering of release paper or release film.

7 Claims, 3 Drawing Figures

GRAVEL-RESISTANT SELFADHESIVE DECORATIVE FILM

The present invention relates to a selfadhesive decorative film which is thermoformable and which is in particular useful for corrosion protection, gravel protection, vibration-damping and the like in the automotive industry.

Selfadhesive decorative films are known and are employed as ornamental and decorative strips. However, they do not have the desired high resistance to flying gravel or the desired thermoformability. They do not give sufficient protection of cars against flying gravel and corrosion. Selfadhesive polyurethane films are also known. However, these cannot be mass-colored and it is not possible to achieve a metallic effect, such as the automotive industry desires.

It is the object of the invention to remedy this situation.

Accordingly, the invention relates to a gravel-resistant selfadhesive decorative film, as characterized in claim 1, namely a thermoformable, gravel-resistant EVA-PVC copolymer film, which can be produced colorless or in a variety of colors and with a particular degree of gloss, the film being coated with a polyurethane primer onto which is applied a shearing-resistant and aging-resistant acrylate selfadhesive composition. The surface of the film can be seated with a colorless water-repellent layer of polyurethane/silicone, with various polyurethane paints or with a polyurethane matt finish. The selfadhesive composition is preferably covered with a dimensionally stable release paper or release film, so that even large punched blanks do not warp on exposure to atmospheric humidity. Advantageous embodiments are additionally set out in the dependent claims and the examples.

The decorative film according to the invention is particularly useful in cars for protecting parts of the bodywork against the effect of flying gravel as well as affording protection against scratching of the door sill by persons entering the car and against scratching at the rear upper edge of the trunk. The use of the selfadhesive film meets the demand of car firms for a color contrast in the lower part of the car while at the same time providing increased protection against flying gravel in this area. If on the other hand an area which is resistant to gravel but is of identical color is required, a colorless film, which allows the "body color" to show through, is preferably used. By using the film, it is possible to save the investment otherwise required for an expensive special paint treatment in the car factory. Moreover, it is cheaper to use the selfadhesive film than the paint. If handled appropriately, the film can be applied without blisters. If it is to be stuck to curved shapes, the selfadhesive film can be heated with hot air, for example using a commercial hot air blower, to assist shaping. After having cooled, the selfadhesive film retains its shape even on extremely highly domed or recessed portions and at convex edges.

If applied to a clean and dry base, the decorative film according to the invention remains correctable in the initial phase, i.e. the film can, without suffering deformation, be peeled off again and stuck on afresh. After having been stuck on, the selfadhesive composition produces a firm and durable bond within an hour.

However, if repairs have to be carried out, the selfadhesive film can be removed again if sufficient force is exerted. After a new piece of film has been stuck onto the repaired area, a difference between the new piece and the old piece next to it is hardly discernible, because of the good light-resistance and weathering resistance of the film.

Because of its stability and good thermoformability the film can be used not only in the automotive industry but also in other industrial sectors, for example as a substitute for a silicone composition for fixing machinery components exposed to vibration hazard.

The new gravel-resistant decorative film in particular offers protection against damage due to flying gravel. It can be applied both to plane and to curved surfaces and be placed round curved edges. Moreover, the film particularly offers the decorative effect required.

The film can be used in place of paint for protecting bare metal, for example if, in the case of a used car, a corroded surface in the part of the bodywork which is likely to be hit by flying gravel is ground down to the bright metal and is then provided with the film according to the invention in order to protect it.

In detail, the decorative film according to the invention preferably consists of the following components:

The main raw material, namely EVA-PVC copolymer, a mixture of materials with K values of 60, 68 and 79, is provided with polymeric plasticizers, namely polyesters, especially of adipic acid and butanediol, and with monomeric plasticizers, namely $C_7$-$C_9$-phthalate, and is stabilized with Ba, Cd or Sn stabilizers. Further additives consist of $CaCO_3$ and $SiO_2$ as fillers, $Sb_2O_3$ as a flameproofing agent and colored pigments.

Film thickness: 80–900 μm

Film structure: single-ply twin-ply triple-ply

Primer: non-reactive, linear aliphatic polyurethane resin 12% strength solution in a mixture of 50 parts of isopropanol, 37 parts of toluene and 13 parts of ethyl acetate Final coat: a copolymer of octyl acrylate and methyl acrylate with free carboxyl groups corresponding to about 5% of acrylic acid, in the form of a 31% strength solution in a mixture of 55 parts of ethyl acetate, 35 parts of isopropanol and 10 parts of hexane, and polyacrylate compositions of similar formulation.

Adhesive covering:
  (a) Siliconized release paper
  (b) Release film, lacquered with a polyurethane-silicone, film bases such as colorless calendered film but without $Sb_2O_3$, or other moldable films.

Surface seal (optional):
  (a) Polyurethane-silicone, 25% strength solution in a mixture of 50 parts of isopropanol, 37 parts of toluene and 13 parts of ethyl acetate
  (b) Polyurethane paints, as illustrated by the following anthracite-gray metallic paint

|  | Parts by weight |
| --- | --- |
| non-reactive, linear, aliphatic polyurethane resin | 62–70 |
| triisocyanate (reaction product of hexamethylene diisocyanate with 17% isocyanate content) | 7–12 |
| dibutyl-tin diacetate | 0.5–0.8 |
| black pigment | 12–20 |
| yellow pigment | 0.2–0.8 |
| brown pigment | 0.3–0.7 |

-continued

| | Parts by weight |
|---|---|
| aluminum pigment | 4–8 |

25% strength solution in a mixture of 50 parts of isopropanol, 37 parts of toluene and 13 parts of ethyl acetate (c) Polyurethane matt finish, for example according to German Patent No. 2,629,535

| Parts by weight | |
|---|---|
| 50–100 | non-reactive, linear, aliphatic polyurethane resin |
| 5–20 | triisocyanate |
| 0.5–5 | organopolysiloxane |
| 0.05–3 | organopolysiloxane crosslinking agent |
| 0–3 | dibutyl-tin diacetate |
| 1–15 | microfine silicate matting agent, secondary particle size 2–15 micrometers |

22% strength solution in a mixture of 50 parts of isopropanol, 37 parts of toluene and 13 parts of ethyl acetate.

The colorless and colored calendered films can be produced on calenders conventionally used in industry. The lamination to produce a twin-ply or triple-ply film is effected under high pressure and at high temperature, to give a physical bond. This structure achieves substantially improved resistance to flying gravel.

In development of the film according to the invention particular problem which arose was anchoring the adhesive composition to the chemically and physically stable base material; this was finally achieved with the aid of a polyurethane primer. The polyurethane in particular anchors to the film if it is heated together with the film to about 120° C. for a residence time of about 5 minutes. For example, a 12% strength solution of the polyurethane primer is applied on a coating line, with spreader bar, for selfadhesive tapes and is dried in a drying tunnel at 120° C. for a residence time of 5 minutes. After drying, the primer coating weight is 1–10 g/m².

Advantageously, a 31% strength solution of the polyacrylate composition is applied in a separate process step or in conjunction with the priming coat, and is dried for 5–10 minutes at 80°–120° C.; the weight applied is 30–70 g/m². On a laminating station of the calender, the adhesive composition is covered with release paper or release film. If required, the material thus produced can be provided, in a subsequent step and by the same process as used for the primer coat, with a colorless polyurethane/silicone seal, a polyurethane paint or a polyurethane matt finish; the weight of coating applied is, after drying, 10–50 g/m².

The surface seal can however also be applied to the film at the start of the production process.

The material, wound into bales, is cut lengthwise to suitable dimensions on cutting machines and is then punched into blanks for final use.

If the film according to the invention is covered with a moldable release film it can be brought to any desired shape not only in the form of blanks but also by thermoforming. A 300–900 μm base film provided with the adhesive composition and release film can satisfactorily be vacuum formed, on thermoforming machines conventionally used in industry, at 150°–550° C. in 8–25 seconds. The film can also be thermoformed by a combination of vacuum and pressure, to give either a concave or a convex shape. This shape subsequently remains dimensionally stable and the molding can, after the release film has been peeled off, be stuck, as a prematched article, even onto highly shaped base surfaces.

The adhesiveness of the film according to the invention persists even on storage for long periods. The combination of film and selfadhesive composition is so matched that there are no interactions between the adhesive composition and the plasticizer contained in the film; such interactions would usually produce a marked decrease in adhesiveness.

There now follow some examples which illustrate the invention, without being intended to imply any limitation.

EXAMPLE 1

Using the following raw materials

| | Parts by weight |
|---|---|
| VA-PVC copolymer, K value 68, 10% EVA | 31 |
| VA-PVC copolymer, K value 60, 10% EVA | 24 |
| VA-PVC copolymer, K value 79, 50% EVA | 23 |
| Polymethyl methacrylate | 2 |
| Adipic acid/butanediol polyester | 12 |
| $C_7$–$C_9$ phthalate | 2.5 |
| Ba-Cd stabilizer | 2.5 |
| $CaCO_3$ | 5 |
| $SiO_2$ | 1 |
| $Sb_2O_3$ | 1 |
| Carbon black | 1 | and employing the process described, on a coating line for selfadhesive tapes, a 300 μm thick single-ply film colored black and having a smooth surface is coated with 5 g/m² of primer and 54 g/m² of final coat and is covered with siliconized release paper.

The selfadhesive material thus produced is cut lengthwise into 19 mm wide strips, and these are stored under standard temperature and humidity conditions and also, for accelerated aging, at 40° C.

The adhesive strips retain their adhesiveness unchanged within the permitted tolerances, even on prolonged storage.

Figure 2:
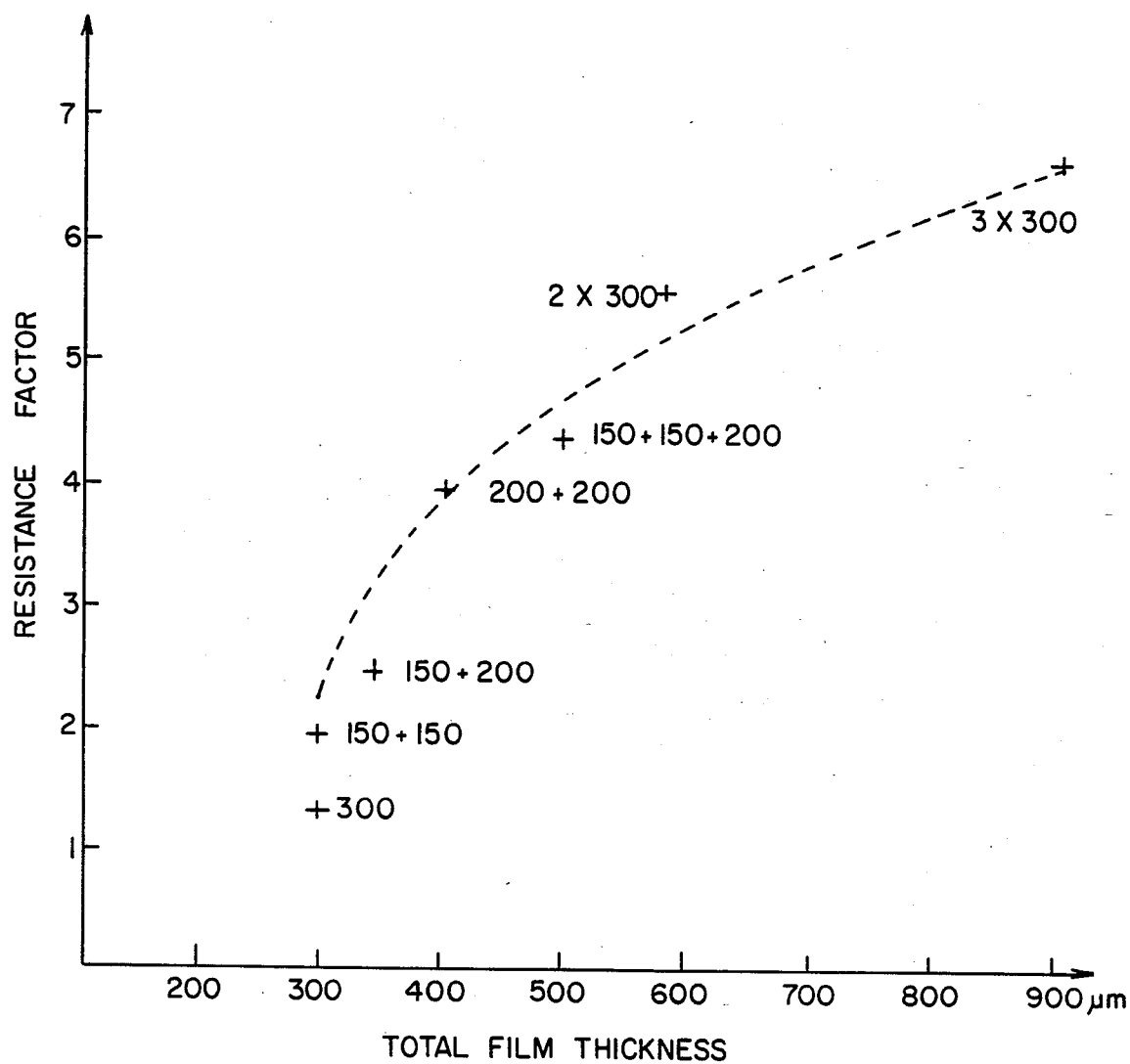

Measurements of the adhesive characteristics give the following results:

| Storage under standard conditions of temperature and humidity | Adhesion to steel, N/cm (see FIG. 1) | Peel strength N/cm (see FIG. 2) |
|---|---|---|
| after 1 week | 9.74 | 0.05 |
| after 1 month | 9.11 | 0.08 |
| after 3 months | 11.16 | 0.06 |
| after 6 months | 11.62 | 0.08 |
| after 12 months | 11.24 | 0.08 |
| Storage at 40° C. | | |
| after 1 month | 7.40 | 0.08 |
| after 3 months | 9.36 | 0.13 |

In the flying gravel test, the film gives a stability rating of 1.3.

Flying gravel test

Figure 3:
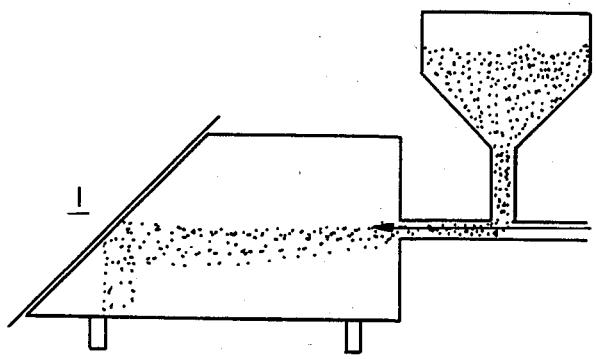

The resistance to flying gravel is tested in an apparatus as shown diagrammatically in FIG. 3.
Blasting material: Hard chippings, 2/4 mm
Amount: 3.5 kg per cycle Duration: about 10' per cycle
Test distance: 30 cm+10 cm blasting tube length
Compressed air pressure: 3 atmospheres gauge The piece of film to be tested, of size 10×10 cm, is stuck onto a glass plate. The test plate is made up, and fixed in position under standard conditions of temperature and humidity, with the film facing inwards, as shown in the sketch.

The compressed air valve is opened and the reducing valve, with air passing, is set to 3 atmospheres gauge. 3.5 kg of clean 2/4 mm chippings are poured into the hopper, seized by the stream of air and blasted against the film sample. The duration is about 10 minutes in each case.

After each test cycle, the samples are examined for damage. When the first perforation of the film is observed, the number of sequences the film has withstood is recorded.

The stability factor is calculated from the number of blasting cycles.

Stability factor 1=6 blasting cycles. Definition of adhesion to steel

The adhesion is measured on test sheets of stainless steel (V2 A, 18/8, composition: carbon<0.12%, nickel>8%, chromium>17%, Brinell hardness: 130–200) of size 200×50×2 mm having a surface roughened with emery VSM/Vitex, CP-331, Fepa particle size 240. The peeling force is applied at 180°, using a tensile tester at a peeling rate of 300 mm/min.

After conditioning of the material to be tested and the measurement jig for 24 hours at 22±1° C. and 50% relative humidity, an adhesive tape at most 25 mm wide has its covering film removed and is then stuck blister-free onto the acetone-clean steel plate and pressed against it with a steel roller of 80 mm diameter, under 2 kg load (5 to and fro movements, speed 10 m/min).

Immediately after the film has been pressed down with the roller, the steel plate is clamped vertically in the lower clamping jaw of the tensile tester and the protruding end of the test strip is fixed in the upper clamping jaw. Immediately thereafter, the tensile tester is started. For each test strip, five measurements are taken at about equal distances, the first value after not less than 25 mm has been peeled off and the last value 25 mm before reaching the end of the steel plate. The mean value of the measurements obtained is quoted, in N/cm.

Definition of peel strength

The force required to peel the covering material from the adhesive composition is measured on a tensile tester at a peeling rate of 300 mm/min.

The material to be tested is conditioned for 24 hours at 22°+1° C. and 50% relative humidity.

Using a maximally 25 mm wide covered test strip, the covering material is clamped in the upper jaw of the tensile tester and the thus uncovered adhesive strip in the lower jaw. The distance between the clamping jaws is 50 mm. The two strips are pulled apart at an angle of about 90°≧20°. During this peeling, care must be taken to maintain the prescribed peeling angle; this is done by slightly raising or pressing down the bonded sample by means of a thin rod (for example a pencil).

After 2–3 cm have been peeled off, the readings of the pointed are started. Five values are read off at equal intervals distributed over a distance of about 15 cm. The arithmetic mean of the values read off is calculated; the peel strength is quoted in N/cm.

EXAMPLE 2

Using the raw materials described in Example 1 and the process described earlier, on a coating line for selfadhesive tapes, a single-ply film 300 m thick, colored black and with a grained surface, is coated with 4 g/m² of primer, 15 g/m² of colorless polyurethane/silicone surface seal and 46 g/m² of final coat, and is covered with siliconized release paper. The selfadhesive material thus produced is cut lengthwise into 19 mm wide strips and is stored under standard conditions of temperature and humidity and also, for accelerated aging, at 40° C. The adhesive strips retain their adhesion unchanged within the tolerance range, even on prolonged storage.

Measurements of the adhesive characteristics give the following results:

| Storage under standard conditions of temperature and humidity | Adhesion to steel, N/cm (see FIG. 1) | Peel strength N/cm (see FIG. 2) |
| --- | --- | --- |
| after 1 week | 10.41 | 0.05 |
| after 1 month | 6.32 | 0.05 |
| after 3 months | 9.38 | 0.08 |
| after 6 months | 9.32 | 0.07 |
| after 12 months | 11.18 | 0.08 |
| Storage at 40° C. | | |
| after 1 month | 6.26 | 0.05 |
| after 3 months | 7.44 | 0.06 |

In the flying gravel test, the film gives a stability rating of 1.3.

The technical data of the selfadhesive tapes of Examples 1 and 2 may be tabulated as follows:

| | Example 1 | Example 2 |
| --- | --- | --- |
| Tensile strength, N/cm | | |
| lengthwise | 2,020 | 1,930 |
| crosswise | 1,470 | 1,570 |
| Elongation at break, % | | |
| lengthwise | 241 | 215 |
| crosswise | 243 | 250 |
| Heat stability; 24 hours' storage at 80° C. of a bond to lacquered steel plate | no shrinkage, no creasing | |
| Lightfastness, analogous to DIN 54,004 Xenotest 150 Black panel temperature 60° C. | >7 | >7 |
| Outdoor weathering simulation | | |
| 1,000 hours | satisfactory | satisfactory |
| 1,000 hours with water spray | satisfactory | satisfactory |
| Adhesion | | |
| Adhesion to paint, N/cm (peeling angle 180°; speed 100 mm/min). Immediate measurement | 5.1 | 5.1 |
| Measurement after | | |
| 24 hours' storage at 22° C. | 6.0 | 6.0 |
| 15 minutes at 100° C. | 12.1 | 10.5 |
| 120 hours at 80° C. | 13.0 | 11.3 |
| 15 minutes at 100° C. and 16 hours at −30° C., test at −30° C. | 15.0 | 15.0 |
| 240 hours at 40° C./100% relative humidity, under the influence of condensation water | no migration under the bond. | |
| Fuel resistance (10 immersions in test fuel) | | |
| 50% by volume of toluene 30% by volume of isooctane 15% by volume of diisobutylene | no change | |

| | Example 1 | Example 2 |
|---|---|---|
| 5% by volume of ethanol Detergent resistance (24 hours' storage of the bond in 1% strength detergent solution at 70° C.) | no migration under the bond | |
| Salt spray mist test, 240 hours | satisfactory | satisfactory |
| Burning characteristics: | | corresponds to the requirements of U.S. Motor Vehicle Safety Standard 302 |

EXAMPLE 3

Using the raw materials described in Example 1 and the process mentioned above, on a laboratory coating line, a 300 μm thick film consisting of two plies each of 150 μm and 150 μm, colored black and with a smooth surface, is coated with 3 g/m² of primer and 32 g/m² of final coat and covered with siliconized release paper. The selfadhesive material thus produced is subjected to a flying gravel test and is found to have a resistance factor of 2.0. This resistance is 54% higher than for a single-ply 300 μm film.

EXAMPLE 4

Using the raw materials described in Example 1 and the process mentioned above, on a laboratory coating line, a single-ply 400 μm thick film, colored black and with a smooth surface, is coated with 3 g/m² of primer and 50 g/m² of final coat and is covered with a release film. The selfadhesive material thus produced is subjected to a flying gravel test and is found to have a resistance factor of 2.5. This resistance is 92% higher than for a single-ply 300 μm film.

EXAMPLE 5

Using the raw materials described in Example 1 and the process mentioned above, on a coating line for selfadhesive tapes, a 500 μm thick three-ply film, consisting of 2×150 μm plies and one 200 μm ply, colored black, is coated with 2 g/m² of primer, 48 g/m² of final coat and 32 g/m² of anthracite-gray metallic polyurethane paint and is covered with release paper.

The coating of anthracite-gray metallic polyurethane paint serves to seal the film and achieves an improvement in its surface character.

The selfadhesive material thus produced is subjected to a flying gravel test and is found to have a resistance factor of 4.3. This resistance is 231% higher than for a single-ply 300 μm film.

EXAMPLE 6

Using the raw materials described in Example 1 and the process mentioned above, on a coating line for selfadhesive tapes, a 900 μm thick three-ply film, each ply being 300 μm thick, colored black, is coated with 5 g/m² of primer, 14 g/m² of a colorless polyurethane/silicone surface seal and 70 g/m² of final coat and is covered with a release film.

The selfadhesive material thus produced is molded on a positive mold in a vacuum forming machine for 24 seconds at a temperature of 550° C., produced by radiant heat. On the film surface facing away from the radiation, the temperature is 120° C. The cooling time is 41 seconds. The resulting article is dimensionally stable and the release film can be removed perfectly. The self-adhesive part can, without difficulty, be stuck onto a highly curved portion of car bodywork, to serve as protection against flying gravel. In the flying gravel test, the film has a stability factor of 6.5. The resistance to flying gravel is 400% higher than for a single-ply 300 μm film.

EXAMPLE 7

Using the raw materials described in Example 1 and the process mentioned above, on a coating line for selfadhesive tapes, a 600 μm thick twin-ply film, each ply being 300 μm thick, colored black, is coated with 5 g/m² of primer, 9 g/m² of polyurethane matt finish and 53 g/m² of final coat and is covered with a release film. The selfadhesive material thus produced is thermoformed on a vacuum/pressure thermoforming machine over a positive mold, for 10 seconds at a temperature of 155° C. (top) and 150° C. (bottom) produced by radiant heat. The cooling time in the same cycle is 10 seconds. The article thus produced remains dimensionally stable and the release film can be removed perfectly. The degree of gloss of the polyurethane matt finish remains at 22% (reflectometer measuring head at 60°), and is unaffected by the action of the heat and by the thermoforming. In the gravel resistance test, the film gives a resistance factor of 5.5. The resistance to flying gravel is 325% higher than for a single-ply 300 μm film.

EXAMPLE 8

Using the following raw materials

| | Parts by weight |
|---|---|
| EVA-PVC copolymer, K value 68, 10% EVA | 34 |
| EVA-PVC copolymer, K value 60, 10% EVA | 26 |
| EVA-PVC copolymer, K value 79, 50% EVA | 25 |
| Polymethyl methacrylate | 4 |
| Polyester, especially of adipic acid and butanediol | 14 |
| $C_7$–$C_9$ phthalate | 3 |
| Sn stabilizer | 2 | and employing the process described on a laboratory coating line, a 400 μm thick twin-ply film, each ply being of 200 μm, colorless, and having a smooth surface, is coated with 4 g/m² of primer and 50 g/m² of final coat and is covered with siliconized release paper, as described in Example 1.

When this coated film is stuck to car paintwork, the original paintwork color is easily discernible. In contrast to the decorative character achieved when using a colored film, the body color in this instance remains preserved, as desired.

In the flying gravel test, the film gives a resistance factor of 4.0.

The resistance to flying gravel is 208% higher than for a single-ply 300 μm film.

We claim:

1. A gravel-resistant selfadhesive decorative film which consists of
   (a) a thermoformable base of a calendered EVA-PVC copolymer film 80–900 μm thick, which is
   (b) coated with a polyurethane primer on which is applied
   (c) a shearing-resistant, aging-resistant acrylate selfadhesive composition on which is present
   (d) a covering of release paper or release film.

2. A decorative film according to claim 1, which also possesses (e) a surface sealing coat on the otherwise uncoated side of the base, which sealing coat consists of polyurethane/silicone, polyurethane paint or polyurethane matt finish.

3. A decorative film according to claim 1 in which the EVA-PVC copolymer base (a) comprises 30–35 parts by weight of EVA-PVC copolymer having a K value of 68 and containing 10% of EVA, 23–28 parts by weight of an EVA-PVC copolymer having a K value of 60 and containing 10% of EVA, 22–26 parts by weight of an EVA-PVC copolymer having a K value of 79 and containing 50% of EVA, 1–4 parts by weight of polymethyl methacrylate and 10–14 parts by weight of polyester, in addition to plasticizers, colorants, stabilizers, processing aids and fillers.

4. A decorative film according to claim 1, wherein a base (a) is a single-ply, twin-ply or triple-ply calendered film.

5. A decorative film according to claim 1, wherein the primer (b) is a non-reactive, linear, aliphatic polyurethane resin primer.

6. A decorative film according to claim 1, wherein the selfadhesive composition (c) is a copolymer of isooctyl acrylate and methyl acrylate, containing free carboxyl groups corresponding to about 5% of acrylic acid.

7. A decorative film according to claim 1, wherein the top coat (d) is a siliconized release paper or a release film, such as a silicone-lacquered polyurethane film.

* * * * *